United States Patent
Rodriguez Bravo et al.

(10) Patent No.: US 10,838,710 B2
(45) Date of Patent: Nov. 17, 2020

(54) DYNAMICALLY UPDATING SECURITY PREFERENCES IN AN INTERNET OF THINGS (IOT) ENVIRONMENT

(71) Applicant: International Business Machines Corporation, Armonk, NY (US)

(72) Inventors: Cesar Augusto Rodriguez Bravo, Alajuela (CR); Gregory J. Boss, Saginaw, MI (US); Romelia H. Flores, Keller, TX (US)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 15/980,133

(22) Filed: May 15, 2018

(65) Prior Publication Data
US 2019/0354367 A1    Nov. 21, 2019

(51) Int. Cl.
| H04L 29/06 | (2006.01) |
| G06F 8/656 | (2018.01) |
| H04L 29/08 | (2006.01) |
| G06F 21/57 | (2013.01) |

(52) U.S. Cl.
CPC ............ *G06F 8/656* (2018.02); *G06F 21/57* (2013.01); *H04L 63/1433* (2013.01); *H04L 67/12* (2013.01)

(58) Field of Classification Search
USPC ........................................................ 713/189
See application file for complete search history.

(56) References Cited

U.S. PATENT DOCUMENTS

| 4,919,545 A | 4/1990 | Yu |
| 6,119,230 A | 9/2000 | Carter |
| 6,158,010 A | 12/2000 | Moriconi et al. |
| 7,673,323 B1 | 3/2010 | Moriconi |
| 9,674,701 B2* | 6/2017 | Kim ...................... H04W 12/06 |
| 9,877,353 B2* | 1/2018 | Lee ....................... H04W 76/34 |
| 9,977,415 B2* | 5/2018 | Zimmerman ........... H04L 67/10 |
| 10,129,736 B2* | 11/2018 | Park ....................... H04W 8/205 |
| 10,153,908 B2* | 12/2018 | Kravitz ............... H04L 63/0876 |

(Continued)

FOREIGN PATENT DOCUMENTS

| CN | 104468614 A | 3/2015 |
| CN | 106537849 A | 3/2017 |

(Continued)

OTHER PUBLICATIONS

HelpNetSecurity, "Checklist: IoT security and privacy", https://www.helpnetsecurity.com/2016/10/05/checklist-iot-security-privacy/, Copyright 1998-2018 by Help Net Security, 4 pages.

(Continued)

*Primary Examiner* — Amare F Tabor
(74) *Attorney, Agent, or Firm* — William H. Hartwell; Hunter E. Webb; Keohane & D'Alessandro, PLLC

(57) ABSTRACT

Approaches presented herein enable dynamically updating, based on a status of one or more Internet of Things (IoT) devices in an IoT network, a security setting of an IoT device controller and/or at least one of the one or more IoT devices. A status of each of a plurality of IoT devices in the IoT network is monitored. In response to the monitoring of at least one status among the plurality of IoT devices, an event requiring a security setting update is identified. The security setting update is then dynamically applied.

17 Claims, 6 Drawing Sheets

(56) References Cited

U.S. PATENT DOCUMENTS

| | | | |
|---|---|---|---|
| 10,264,066 B2* | 4/2019 | Fishler | H04L 67/12 |
| 10,452,381 B2* | 10/2019 | Khakpour | H04L 69/14 |
| 10,498,750 B2* | 12/2019 | Bansal | H04L 67/10 |
| 2015/0006695 A1 | 1/2015 | Gupta | |
| 2016/0065653 A1 | 3/2016 | Chen et al. | |
| 2016/0070276 A1 | 3/2016 | Joshi et al. | |
| 2016/0070614 A1 | 3/2016 | Joshi et al. | |
| 2016/0070920 A1 | 3/2016 | Joshi et al. | |
| 2016/0071148 A1 | 3/2016 | Joshi et al. | |
| 2016/0071183 A1 | 3/2016 | Joshi et al. | |
| 2016/0071184 A1 | 3/2016 | Joshi et al. | |
| 2016/0071196 A1 | 3/2016 | Joshi et al. | |
| 2016/0071219 A1 | 3/2016 | Joshi et al. | |
| 2016/0072891 A1 | 3/2016 | Joshi et al. | |
| 2016/0147506 A1 | 5/2016 | Britt et al. | |
| 2017/0054594 A1* | 2/2017 | Decenzo | H04L 67/12 |
| 2017/0171607 A1* | 6/2017 | Britt | H04N 21/25816 |
| 2018/0103039 A1* | 4/2018 | Thaler | H04L 67/12 |
| 2018/0191729 A1* | 7/2018 | Whittle | H04L 63/0227 |
| 2018/0191814 A1* | 7/2018 | Kinarti | H04L 67/104 |
| 2018/0295505 A1* | 10/2018 | Maria | H04L 9/14 |
| 2019/0014117 A1* | 1/2019 | Li | H04L 9/3213 |
| 2019/0132269 A1* | 5/2019 | Nolan | H04L 51/046 |
| 2019/0132774 A1* | 5/2019 | Jang | H04W 28/04 |

FOREIGN PATENT DOCUMENTS

| | | |
|---|---|---|
| CN | 107077776 A | 8/2017 |
| CN | 107948231 A | 4/2018 |
| EP | 3192060 A2 | 7/2017 |
| JP | 2017532653 A | 11/2017 |
| KR | 20150136981 A | 12/2015 |
| WO | 2016040378 A2 | 3/2016 |
| WO | 2017/015323 A1 | 1/2017 |

OTHER PUBLICATIONS

ComputerWeekly.com, "How to secure the internet of things", http://www.computerweekly.com/opinion/How-to-secure-the-internet-of-things, Copyright 2000-2018, TechTarget, 5 pages.
Wikipedia, "Mirai (malware)", https://en.wikipedia.org/wiki/Mirai_(malware), Feb. 6, 2018, 5 pages.
Krebs on Security, "In-depth security news and investigation", https://krebsonsecurity.com/2016/10/source-code-for-iot-botnet-mirai-released/, Copyright 2018 Krebs on Security, 12 pages.
"Reality Check: Getting Serious About IoT Security", http://www.darkreading.com/iot/reality-check-getting-serious-about-iot . . . , Copyright 2018 UBM, 8 pages.
Gyory, Nathaniel et al., IoTOne: Integrated Platform for Heterogeneous IoT Devices, 2017 International Conference on Computing, Networking and Communications (ICNC): Workshop, IEEE Xplore, Jan. 26, 2017, 5 pgs.
Zhang, Qian, "PCT Notification of Transmittal of the International Search Report and the Written Opinion of the International Searching Authority, or the Declaration", PCT/IB2019/053912, dated Aug. 27, 2019, 9 pgs.

* cited by examiner

DYNAMICALLY UPDATING SECURITY PREFERENCES IN AN INTERNET OF THINGS (IOT) ENVIRONMENT

TECHNICAL FIELD

The subject matter of this invention relates generally to computer system security. More specifically, aspects of the present invention provide an automatic dynamic event-based Internet of Things (IoT) security solution.

BACKGROUND

The Internet of Things (IoT) is the network of physical devices, vehicles, home appliances and other items embedded with electronics, software, sensors, actuators, and/or connectivity which can enable these objects to connect and/or exchange data. Simply put, this can enable any device with an on and off switch to connect to the Internet (and/or to each other). This can include everything from cellphones, coffee makers, washing machines, headphones, lamps, wearable devices, etc. This can also apply to components of machines (for example, a jet engine of an airplane or the drill of an oil rig). Devices and objects with built-in sensors can be connected to an IoT platform, which integrates data from the different devices and applies analytics to share the most valuable information with applications built to address specific needs. These powerful IoT platforms can pinpoint exactly what information is useful and what can safely be ignored. This information can be used to detect patterns, make recommendations, and detect possible problems before they occur.

SUMMARY

In general, embodiments of the present invention provide for dynamically updating, based on a status of one or more Internet of Things (IoT) devices in an IoT network, a security setting of an IoT device controller and/or at least one of the one or more IoT devices. A status of each of a plurality of IoT devices in the IoT network is monitored. In response to the monitoring of at least one status among the plurality of IoT devices, an event requiring a security setting update is identified. The security setting update is then dynamically applied.

One aspect of the present invention includes a method for dynamically updating security preferences in an Internet of Things (IoT) environment, the method comprising: monitoring a status of each of a plurality of IoT devices controlled by an IoT device controller in an IoT network; identifying, in response to the monitoring, an event requiring a security setting update; and dynamically applying the security setting update.

Another aspect of the present invention includes a computer program product embodied in a computer readable medium that, when executed by a computer device, performs a method for dynamically updating security preferences in an Internet of Things (IoT) environment, the method comprising: monitoring a status of each of a plurality of IoT devices controlled by an IoT device controller in an IoT network; identifying, in response to the monitoring, an event requiring a security setting update; and dynamically applying the security setting update.

Yet another aspect of the present invention includes a system for dynamically updating security preferences in an Internet of Things (IoT) environment, comprising: a memory medium comprising instructions; a bus coupled to the memory medium; and a processor coupled to the bus that when executing the instructions causes the system to perform a method, comprising: monitoring a status of each of a plurality of IoT devices controlled by an IoT device controller in an IoT network; identifying, in response to the monitoring, an event requiring a security setting update; and dynamically applying the security setting update.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
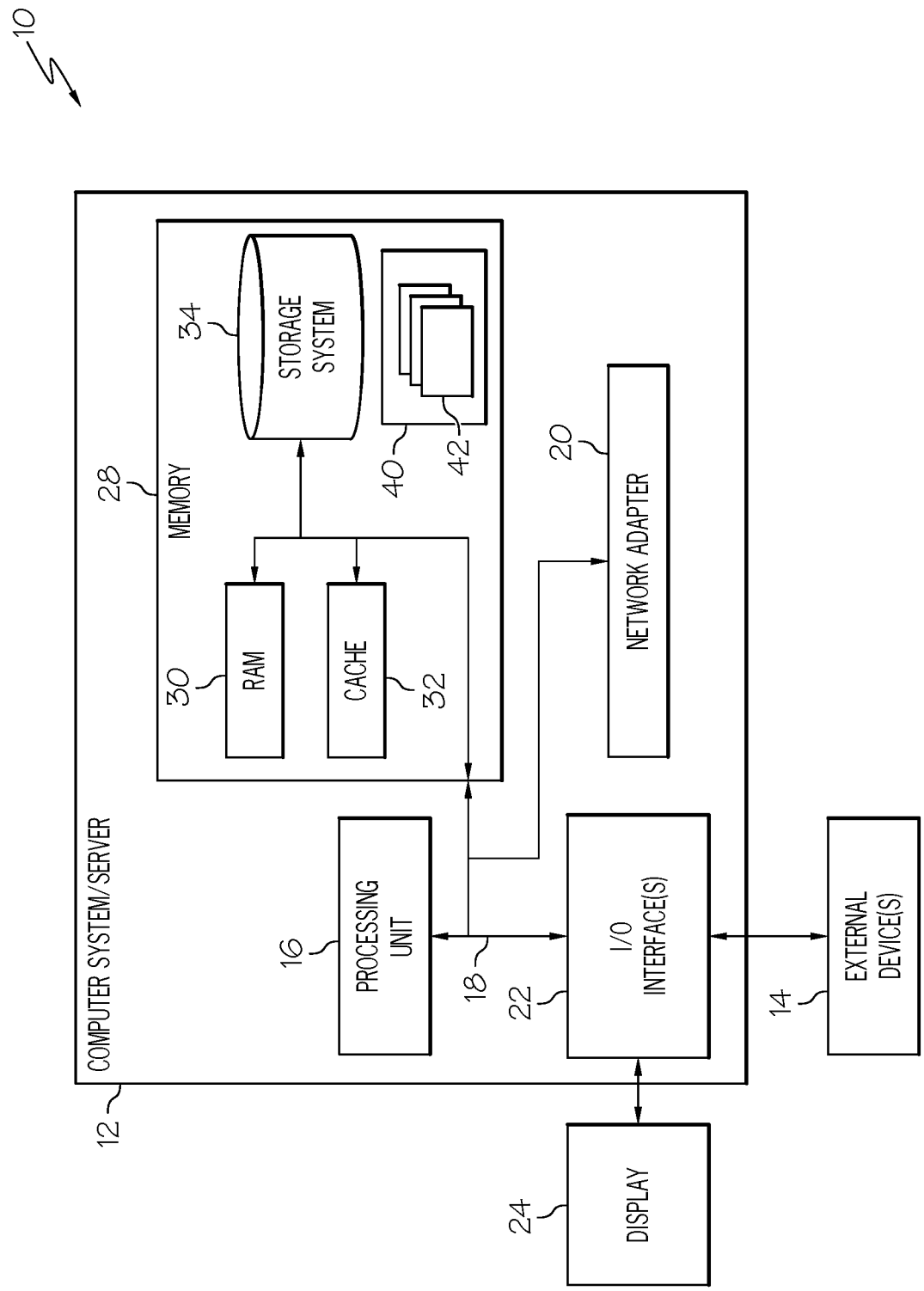
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context. As used herein, the term "status" as it relates to an IoT device includes any number of environmental factors, local factors, and/or factors proximate to a related IoT network.

As stated above, embodiments of the present invention enable dynamically updating, based on a status of one or more Internet of Things (IoT) devices in an IoT network, a security setting of an IoT device controller and/or at least one of the one or more IoT devices. A status of each of a plurality of IoT devices in the IoT network is monitored. In response to the monitoring of at least one status among the plurality of IoT devices, an event requiring a security setting update is identified. The security setting update is then dynamically applied.

The Internet of Things is connecting more devices every day. This growth carries several benefits, as it can change the way people carry out daily tasks. But with these benefits also comes risk, as the increase of devices can give criminals (e.g., hackers) more entry points. Given the number of IoT devices and, in various cases, the shared use of these IoT devices, it can easily become a daunting task to keep up with security for each individual device and understand when these devices should support easy access to services needed from those devices versus restricted access for services to prevent misuse of those devices. This can present several different problems. For example, security settings may be insufficient for a scenario. Further, security settings may be excessively restrictive for a different scenario. The methods described herein present a solution that uses a status of IoT devices to trigger an alert and/or change in a security setting of the IoT network (e.g., device controller, a specific IoT device, and/or a plurality of IoT devices, etc.).

Referring now to FIG. 1, a computerized implementation 10 of an embodiment for dynamically updating, based on a status of one or more Internet of Things (IoT) devices in an IoT network, a security setting of an IoT device controller and/or at least one of the one or more IoT devices will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for dynamically updating, based on a status of one or more Internet of Things (IoT) devices in an IoT network, a security setting of an IoT device controller and/or at least one of the one or more IoT devices. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for dynamically updating, based on a status of one or more Internet of Things (IoT) devices in an IoT network, a security setting of an IoT device controller and/or at least one of the one or more IoT devices, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
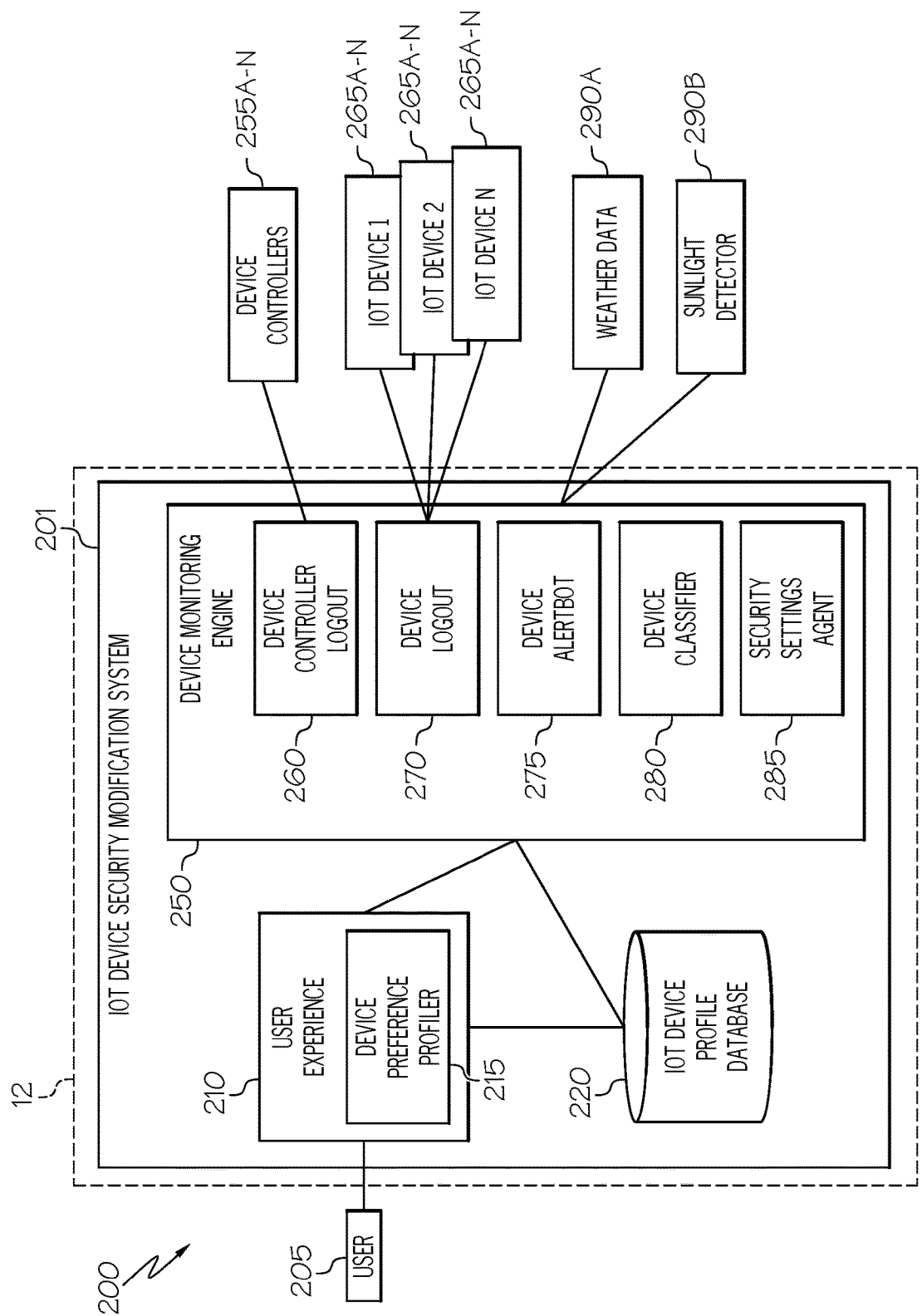
FIG. 2 shows a first schematic diagram 200 illustrating an exemplary environment for implementation according to an illustrative embodiment of the present invention.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a IoT device security modification system 201 (hereinafter "system 201"). Rather, system 201 could be loaded on a server or server-capable device that communicates (e.g., wirelessly) with the physical server for dynamically updating, based on a status of one or more IoT devices in an IoT network, a security setting of an IoT device controller and/or at least one of the one or more IoT devices.

Regardless, as depicted, system 201 can be implemented as program/utility 40 on computer system 12 of FIG. 1 and can enable the functions recited herein. It is further understood that system 201 can be incorporated within or work in conjunction with any type of system that receives, processes, and/or executes commands with respect to IT resources in a networked computing environment. Such other system(s) have not been shown in FIG. 2 for brevity purposes.

As shown, IoT data security modification system 201 includes user experience 210 and device monitoring engine 250. User experience 210 of system 201, as executed by computer system/server 12, is configured to provide an interface for a user 205 to configure and/or manage IoT devices 265A-N. User experience 210 may include a graphical user interface (GUI) which a user 205 uses to give commands or to enter information (e.g., by typing using a keyboard, clicking using a mouse, etc.) via a display screen. Device monitoring engine 250 of system 201, as executed by computer system/server 12, is configured to monitor and/or manage IoT devices 265A-N based on information provided by a user 205 via user experience 210 and/or a number of predefined rules.

User experience 210 includes device preference profiler 215. Device preference profiler 215 can provide a user 205 the ability to register any number of IoT devices along with preferences, baselines, configurations, thresholds, etc., for the system to leverage during operation. Information collected via user preferences profiler 215 (e.g., preferences)

can be stored in a IoT device profile database 220 (e.g., in storage system 34 (FIG. 1)). IoT device profile database 220 can store this information hierarchically, relationally, and/or using any other solution that is now known or later developed. In addition, device preference profiler 215 can identify any device controllers 255A-N that may exist, such as an IoT management hub 255A or the like. Once such an identification has been made, device preference profiler 215 can further be used to configure relationships between an IoT management hub 255A and individual IoT devices 265A-N.

A device controller (e.g., IoT management hub 255A) may be a controller of one or more IoT devices 265A-N in a particular location, such as a home or office. A device controller acts as a management "hub" of information for IoT devices 265A-N. IoT devices 265A-N include various IoT types of devices that can be connected to the Internet or a device controller and enable functions and/or services for a user 205. Examples include, but are not limited to, fireplaces, external faucets, and/or household devices such as large appliances (e.g., a refrigerator, a dishwasher, a washing machine, a dryer, and/or the like); small appliances (e.g., a toaster, a toaster oven, a microwave, a mixer, a blender, and/or the like); entertainment devices (e.g., a television, a radio, a media player, a gaming system, and/or the like); cleaning devices (e.g., a vacuum cleaner, an air purifier, and/or the like); climate control systems (e.g., a thermostat, a heater, a fan, an air conditioner, and/or the like); lighting systems (e.g., a lamp, a light fixture, a light switch, and/or the like); measuring devices (e.g., a clock, a scale, a thermometer, and/or the like); and/or any member of the internet of things that is now known or later developed.

Device classifier 280 can constantly evaluate information (e.g., in real time) provided from IoT devices 265A-N and other data feed sources (e.g., weather data 290A, sunlight detector 290B, etc.) in order to detect IoT device patterns and/or changes which might indicate an event (e.g., a change in a location of a user, a change in weather, a change in network traffic, etc.) which can trigger a response including modifying a function of one or more IoT devices, modifying a function of an IoT device controller, transmitting alert message to a user, etc. For example, device classifier 280 may be responsible for triggering device controller logout 260, device logout 270, device alertbot 275, and/or security settings agent 285. Device controller logout 260 may be triggered by a device classifier 280 to log off specific services in one or more device controllers 255A-N. Device logout 270 may be triggered by a device classifier 280 feature to log off specific applications and/or IoT devices 265A-N. An example IoT application includes a home automation application used to control IoT devices in the home for lighting control, HVAC (heating, ventilation, and air conditioning), outdoor lawn irrigation, kitchen appliances, security systems, and/or the like. For example, all accounts from a smart television may be logged off when it is determined by one or more IoT devices that user 205 has left his home.

In another example, device alertbot 275 may be triggered by a device classifier 280 to automatically transmit an alert message to any number of IoT devices 265A-N to provide information to user 205, such as an indicator for a particular action to be taken by user 205. Security settings agent 285 may be triggered by device classifier 280 to automatically update and/or adjust one or more security settings related to any number of IoT devices 265A-N and/or device controllers 255A-N.

Figure 3:
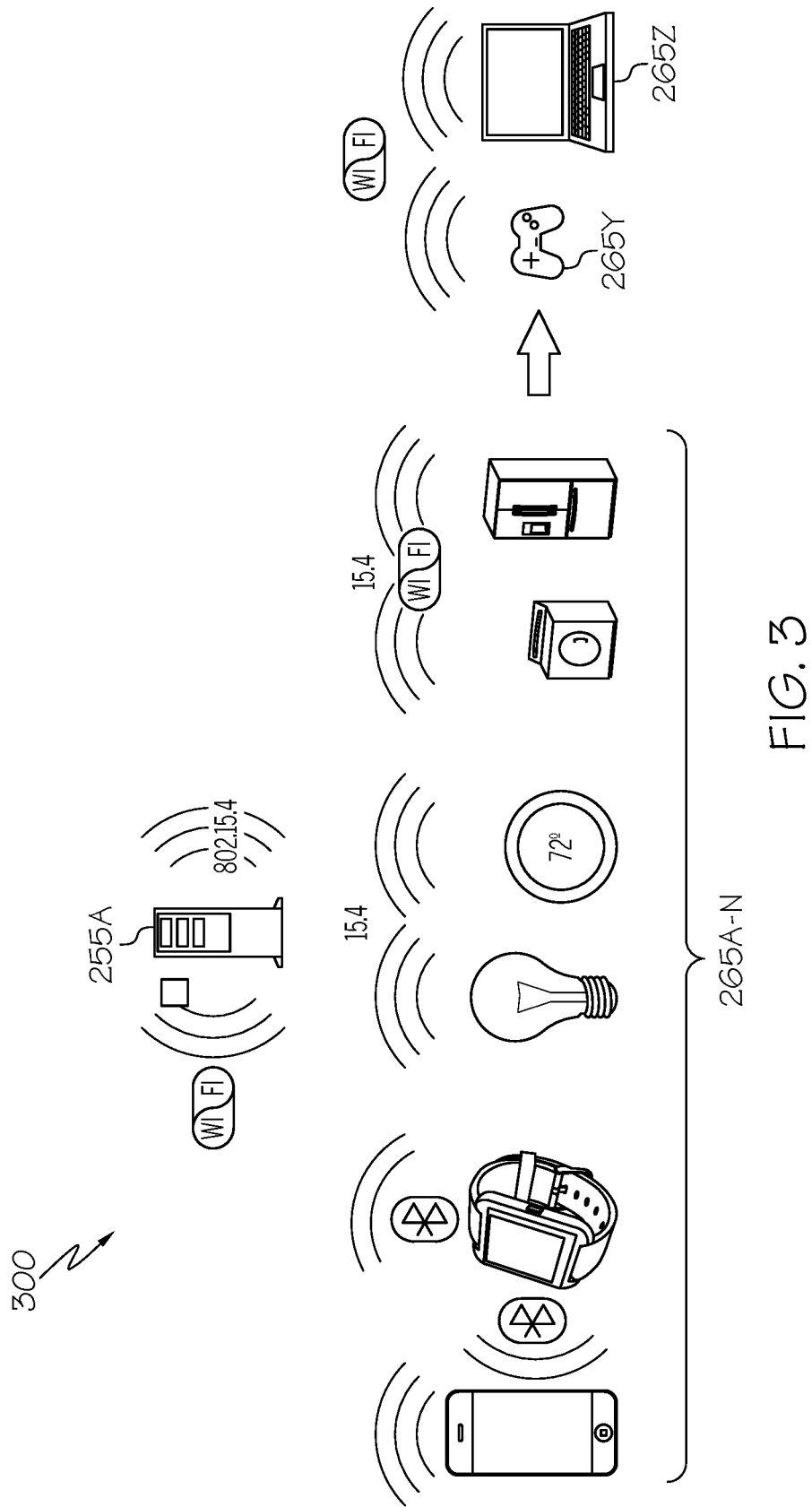
FIG. 3 shows an example schematic 300 for dynamically updating security preferences in an IoT environment according to an illustrative embodiment of the present invention.

FIG. 3 shows an example schematic 300 for dynamically updating security preferences in an IoT environment. IoT devices 265A-N, IoT devices 265Y-Z, and IoT management hub 255A in a house are shown. IoT device 265Y is a video game system and IoT device 265Z is a smart television. These devices may communicate via radio frequency identification (RFiD), Bluetooth, WiFi, wireless, Bluetooth Low Energy (BLE), infrared, and/or any other viable method now known or later developed. In a first scenario, consider IoT devices 265A-N are currently on a standby mode which has been predefined by user 205 when no one is in the home (WiFi is a trademark of the WiFi Alliance). Assume, device classifier 280 receives information from at least one of IoT devices 265A-N indicating that user 205 has left the house leaving the house with no occupants (e.g., all lights off and air conditioning off, etc.). Based on this determination, device classifier may trigger device logout 270 to log off all accounts on IoT devices 265Y-Z. In addition, security settings agent 285 may limit access (e.g., disable local access) to IoT management hub 255A. This can provide increased security when user 205 is away from home to prevent, for example, a potential intruder from disabling an IoT device (e.g., an alarm) to get into the house, by preventing any disabling action when user 205 is not present.

In a second example scenario, an IoT device may be installed that makes an existing air conditioning unit in a house a smart device. The air conditioner may be triggered to go on a standby mode when the house is empty of occupants. This action may trigger security settings agent 285 to automatically perform a security change on one or more other IoT devices. For example, remote access to the IoT network may be automatically enabled.

Figure 4:
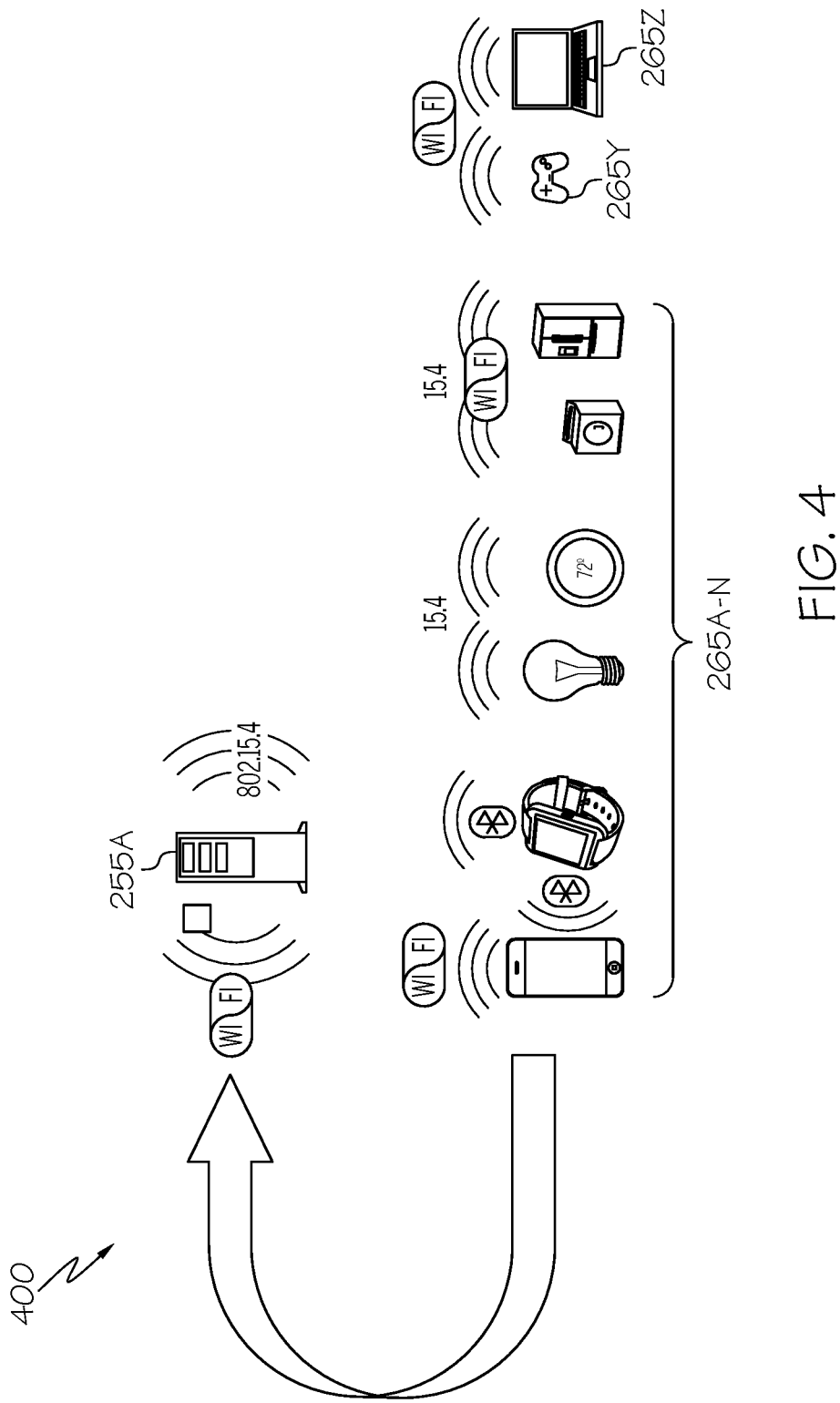
FIG. 4 shows an example schematic 400 for dynamically updating security preferences in an IoT environment according to an illustrative embodiment of the present invention.

FIG. 4 shows an example schematic 400 for dynamically updating security preferences in an IoT environment. Again, IoT devices 265A-N, IoT devices 265Y-Z, and IoT management hub 255A are shown. IoT device 265Y is a video game system and IoT device 265Z is a smart television. Security settings agent 285 may change the security settings on IoT management hub 255A, for example, to avoid unauthorized access. In this example, remote access (e.g., via the Internet) to the IoT management hub 255A may be disabled if the user 205 is at home. This may prevent unauthorized access (e.g., hackers) from getting remote access to the IoT network from outside the home.

Figure 5:
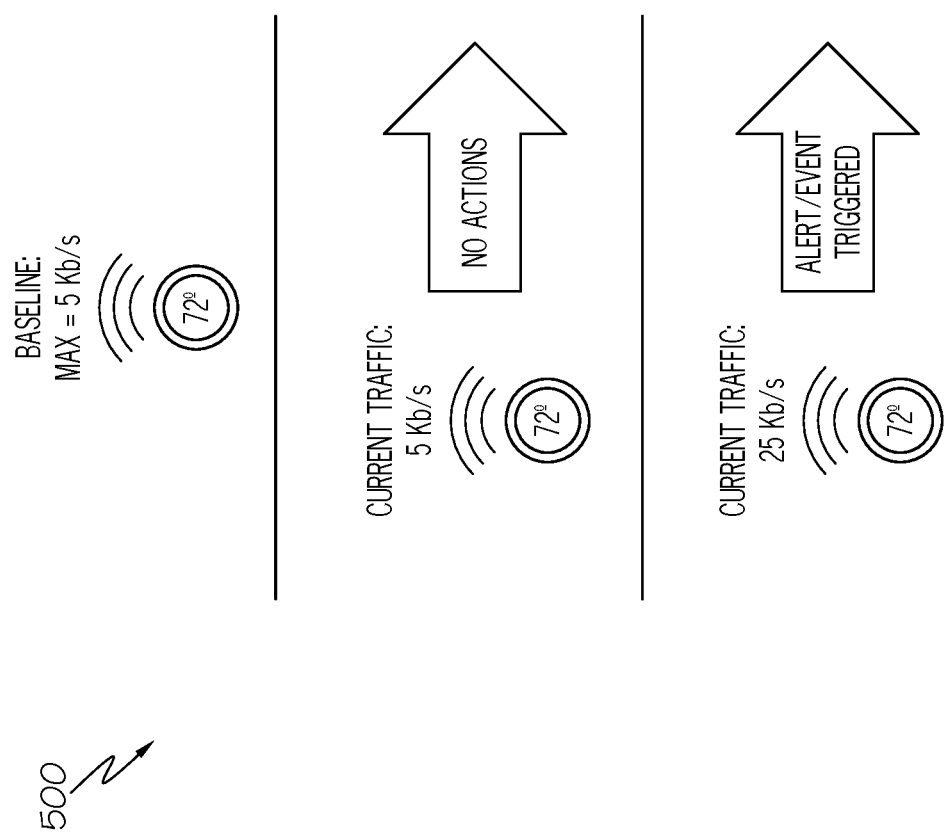
FIG. 5 shows an example schematic 500 for dynamically updating a security setting related to the IoT network itself according to an illustrative embodiment of the present invention.

FIG. 5 shows an example schematic 500 for dynamically updating a security setting related to the IoT network itself based on a traffic level of an IoT device. For example, IoT management hub 255A takes a baseline of an average network traffic of a particular IoT device (e.g., refrigerator, washer, thermostat, etc.). If the current traffic is above a predefined threshold (e.g., at least 10% above the average traffic level), then device alertbot 275 may trigger an alert message. If below the threshold, no action is taken. For example, security settings agent may trigger IoT management hub 255A to shut down some of the network traffic flows to prevent hacking into the home's Internet connection. The threshold may be stored in IoT device profile database 220.

In another example, an IoT device may receive a real-time data feed of weather information (e.g., temperature, forecast, etc.) from weather data 290A indicating a snow storm is approaching. Based on this information, device alertbot 275 may interact with a communication system to transmit a safety message to employees, students, and/or parents of the school. In yet another example, an IoT device may receive a real-time data feed of sunlight information (e.g., light, dark, pure sunlight, simulated sunlight, etc.) from sunlight detector 290B. The data feed may detect multiple days of sunlight during a week of summer. Based on this information, device alertbot 275 may transmit an alert message to user 205 via a display (e.g., a text message to a connected smart phone) to notify the user that a sprinkler system may need to be manually activated.

Figure 6:
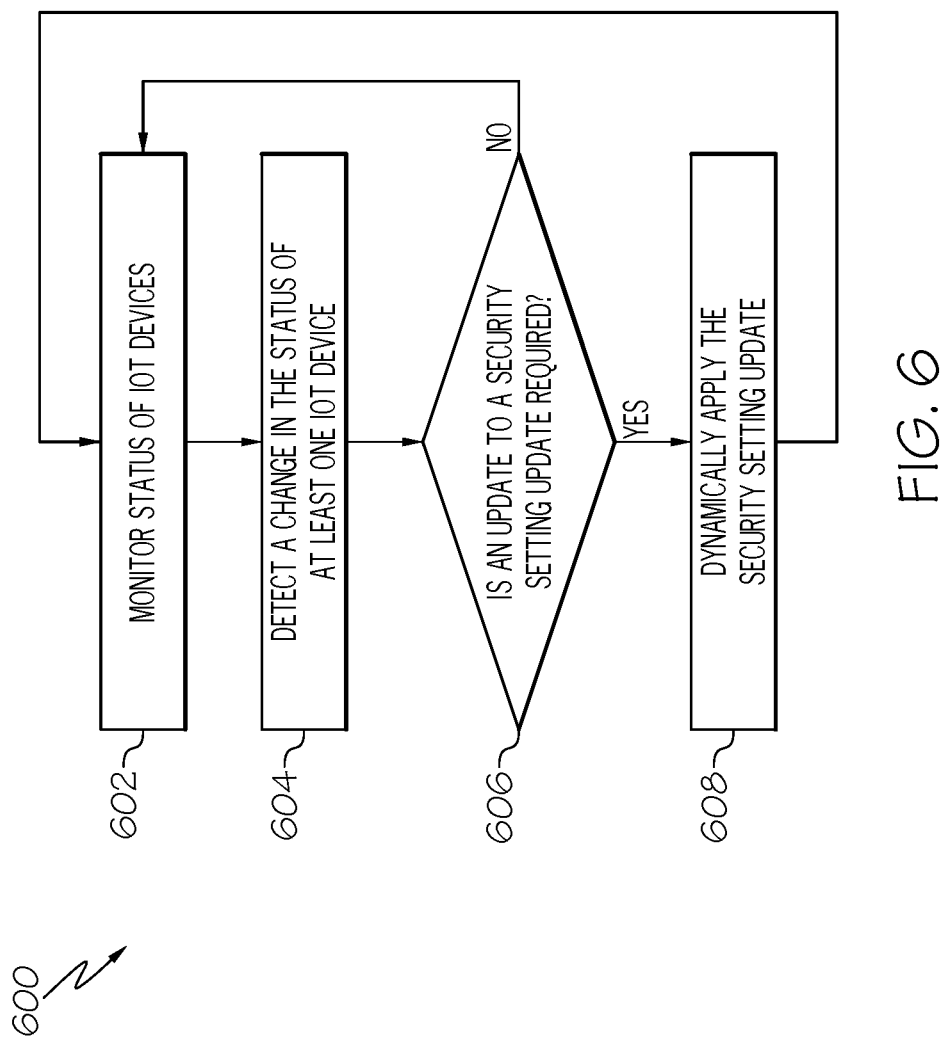
FIG. 6 shows a process flowchart 600 for dynamically updating security preferences in an IoT environment according to an illustrative embodiment of the present invention.

Referring now to FIG. 6, in conjunction with FIG. 2, an implementation of a process flowchart 600 for dynamically updating, based on a status of one or more Internet of Things (IoT) devices in an IoT network, a security setting of an IoT device controller and/or at least one of the one or more IoT devices is shown. At 602, device classifier 280 monitors a status of each IoT devices 265A-N. At 604, device classifier 280 detects a change in the status of at least one of the IoT devices 265A-N. At 606, device preference profiler 215 identifies, based on the change in status, determines whether the change in status is related to an event requiring a security setting update. If so, device classifier 280 dynamically applies the security setting update, at 608. For example, security settings agent 285 may dynamically update and/or adjust one or more security settings related to any number of IoT devices 265A-N and/or device controllers 255A-N. In another example, device alertbot 275 may dynamically transmit an alert message to user 205 related to the security setting to be performed.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for dynamically updating, based on a status of one or more Internet of Things (IoT) devices in an IoT network, a security setting of an IoT device controller and/or at least one of the one or more IoT devices. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for dynamically updating, based on a status of one or more Internet of Things (IoT) devices in an IoT network, a security setting of an IoT device controller and/or at least one of the one or more IoT devices. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for dynamically updating, based on a status of one or more Internet of Things (IoT) devices in an IoT network, a security setting of an IoT device controller and/or at least one of the one or more IoT devices. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for dynamically updating security preferences in an Internet of Things (IoT) environment, the method comprising:
monitoring a status of each of a plurality of IoT devices controlled by an IoT device controller in an IoT network, the monitoring including monitoring a traffic level of an IoT device among the plurality of IoT devices;
identifying, in response to information provided by a first IoT device of the plurality of IoT devices as a result of the monitoring, an event requiring a security setting update to another IoT device of the plurality of IoT devices; and dynamically applying the security setting update, wherein the applying of the security update includes, upon determining the traffic level exceeds a predefined threshold, applying the security setting update to the IoT controller related to the IoT device.

2. The method of claim 1, wherein the applying of the security update includes modifying a function of the IoT device controller consistent with a new security setting.

3. The method of claim 1, wherein the applying of the security update includes modifying a function of at least one IoT device other than the first IoT device among the plurality of IoT devices consistent with a new security setting.

4. The method of claim 1, further comprising transmitting an alert message to a user via a display.

5. The method of claim 1, wherein the event includes a change in a location of a user, and wherein the applying of the security update includes updating an access restriction of the other IoT device based on a change in the location.

6. The method of claim 1, wherein the event includes a change in a weather condition, and wherein the applying of the security update includes modifying a function of the IoT device based on the change in the weather condition detected by the first IoT device.

7. A computer program product embodied in a computer readable medium that, when executed by a computer device, performs a method for dynamically updating security preferences in an Internet of Things (IoT) environment, the method comprising:

monitoring a status of each of a plurality of IoT devices controlled by an IoT device controller in an IoT network, the monitoring including monitoring a traffic level of an IoT device among the plurality of IoT devices;

identifying, in response to information provided by a first IoT device of the plurality of IoT devices as a result of the monitoring, an event requiring a security setting update to another IoT device of the plurality of IoT devices; and dynamically applying the security setting update, wherein the applying of the security update includes, upon determining the traffic level exceeds a predefined threshold, applying the security setting update to the IoT controller related to the IoT device.

8. The computer program product of claim 7, wherein the applying of the security update includes modifying a function of the IoT device controller consistent with a new security setting.

9. The computer program product of claim 7, wherein the applying of the security update includes modifying a function of at least one IoT device other than the first IoT device among the plurality of IoT devices consistent with a new security setting.

10. The computer program product of claim 7, further comprising transmitting an alert message to a user via a display.

11. The computer program product of claim 7, wherein the event includes a change in a location of a user, and wherein the applying of the security update includes updating an access restriction of the other IoT device based on a change in the location detected by the first IoT device.

12. The computer program product of claim 7, wherein the event includes a change in a weather condition, and wherein the applying of the security update includes modifying a function of the IoT device based on the change in the weather condition.

13. A system for dynamically updating security preferences in an Internet of Things (IoT) environment, comprising:

a memory medium comprising instructions;
a bus coupled to the memory medium; and
a processor coupled to the bus that when executing the instructions causes the system to perform a method, comprising:

monitoring a status of each of a plurality of IoT devices controlled by an IoT device controller in an IoT network, the monitoring including monitoring a traffic level of an IoT device among the plurality of IoT devices;

identifying, in response to information provided by a first IoT device of the plurality of IoT devices as a result of the monitoring, an event requiring a security setting update to another IoT device of the plurality of IoT devices; and dynamically applying the security setting update, wherein the applying of the security update includes, upon determining the traffic level exceeds a predefined threshold, applying the security setting update to the IoT controller related to the IoT device.

14. The system of claim 13, wherein the applying of the security update includes modifying a function of the IoT device controller consistent with a new security setting.

15. The system of claim 13, wherein the applying of the security update includes modifying a function of at least one IoT other than the first IoT device among the plurality of IoT devices consistent with a new security setting.

16. The system of claim 13, further comprising transmitting an alert message to a user via a display.

17. The system of claim 13, wherein the event includes a change in a location of a user, and wherein the applying of the security update includes updating an access restriction of the other IoT device based on a change in the location detected by the first IoT device.

* * * * *